United States Patent
Hong

(10) Patent No.: US 12,269,541 B2
(45) Date of Patent: Apr. 8, 2025

(54) STEERING CONTROL DEVICE AND METHOD

(71) Applicant: HL MANDO CORPORATION, Gyeonggi-do (KR)

(72) Inventor: SeungGyu Hong, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 203 days.

(21) Appl. No.: 18/077,231

(22) Filed: Dec. 8, 2022

(65) Prior Publication Data

US 2023/0174144 A1 Jun. 8, 2023

(30) Foreign Application Priority Data

Dec. 8, 2021 (KR) .................. 10-2021-0174407

(51) Int. Cl.
*B62D 5/04* (2006.01)
*B62D 3/12* (2006.01)

(52) U.S. Cl.
CPC ............ *B62D 5/0472* (2013.01); *B62D 3/12* (2013.01); *B62D 5/0421* (2013.01); *B62D 5/0481* (2013.01)

(58) Field of Classification Search
CPC ...... B62D 5/0472; B62D 3/12; B62D 5/0421; B62D 5/0481; B62D 6/008; B62D 5/0463; B62D 5/006; B62D 5/0469; Y02T 10/72
See application file for complete search history.

(56) References Cited

U.S. PATENT DOCUMENTS

| | | | | |
|---|---|---|---|---|
| 11,332,183 | B2* | 5/2022 | Boos | B62D 6/002 |
| 2004/0007416 | A1* | 1/2004 | Furumi | B62D 5/046 |
| | | | | 180/443 |
| 2005/0016790 | A1* | 1/2005 | Murakami | B62D 5/0448 |
| | | | | 180/444 |
| 2005/0280389 | A1* | 12/2005 | Koike | B62D 5/0469 |
| | | | | 318/611 |
| 2006/0027416 | A1* | 2/2006 | Mizuhara | B62D 5/0421 |
| | | | | 180/444 |
| 2009/0173566 | A1* | 7/2009 | Ogasawara | B62D 5/049 |
| | | | | 180/446 |
| 2013/0233638 | A1* | 9/2013 | Lee | B62D 5/0421 |
| | | | | 180/444 |

(Continued)

*Primary Examiner* — Joseph J Dallo
(74) *Attorney, Agent, or Firm* — WOMBLE BOND DICKINSON (US) LLP

(57) ABSTRACT

The embodiment relates to a steering control device and method and includes a steering control device for controlling a first motor generating steering feedback torque in response to rotation of a steering wheel and a second motor generating rack driving torque for moving a rack, comprising a calculation unit calculating allowed rack speed information regarding a rack speed allowed when driving the rack using the second motor, based on rack force information and preset second motor performance information and calculating catch-up prevention torque information for preventing catch-up in the steering wheel, based on the allowed rack speed information and command rack speed information generated to drive the rack at a speed in response to rotation of the steering wheel and a controller performing catch-up prevention control on the first motor based on the catch-up prevention torque information.

15 Claims, 10 Drawing Sheets

(56) References Cited

U.S. PATENT DOCUMENTS

| | | | | |
|---|---|---|---|---|
| 2014/0045634 | A1* | 2/2014 | Hong | B62D 5/0409 |
| | | | | 475/331 |
| 2017/0240201 | A1* | 8/2017 | Kim | B62D 6/10 |
| 2018/0362075 | A1* | 12/2018 | Lee | B62D 5/0421 |
| 2019/0367084 | A1* | 12/2019 | Hong | B62D 6/008 |
| 2020/0070879 | A1* | 3/2020 | Kim | B62D 6/002 |
| 2020/0076335 | A1* | 3/2020 | Suzuki | H02P 21/22 |
| 2020/0307688 | A1* | 10/2020 | Higashi | B62D 6/10 |
| 2023/0174144 | A1* | 6/2023 | Hong | B62D 5/0481 |
| | | | | 701/41 |

* cited by examiner

FIG. 7

| first lookup table | |
|---|---|
| rack force(N) | motor torque(Nm) |
| 10 | 50 |
| 11 | 55 |
| ... | ... |
| ... | ... |
| 30 | 150 |

| second lookup table | |
|---|---|
| rack force(N) | motor torque(Nm) |
| 50 | 3300 |
| 11 | 3000 |
| ... | ... |
| ... | ... |
| 150 | 1100 |

| third lookup table | | | | | |
|---|---|---|---|---|---|
| allowed rack speed \ rack speed difference | 0.1 | 0.2 | ... | ... | 1.0 |
| 0.5 | 0.5 | 1.0 | ... | ... | 5.0 |
| 0.6 | 0.6 | 1.1 | ... | ... | 5.1 |
| ... | ... | ... | ... | ... | ... |
| ... | ... | ... | ... | ... | ... |
| 2.0 | 2.0 | 2.1 | ... | ... | 7.1 | ns
STEERING CONTROL DEVICE AND METHOD

CROSS-REFERENCE TO RELATED APPLICATION

This application claims priority from Korean Patent Application No. 10-2021-0174407, filed on Dec. 8, 2021, which is hereby incorporated by reference for all purposes as if fully set forth herein.

BACKGROUND

Field

The disclosure relates to a steering control device and method and, more specifically, to a steering control device and method for correcting steering feedback torque considering motor output.

Description of Related Art

In vehicle steering systems, the limited capacity of the steering device may cause catch-up that results in the driver failing to feel reaction force or drive at a desired speed.

Steer-by-wire (SBW) systems, which have the upper end and lower end separated, may not recognize catch-up at the upper end unlike electric power steering (EPS) systems in which the upper end and lower end are physically connected.

Thus, a need exists for technology capable of quickly recognizing and preventing catch-up.

BRIEF SUMMARY

The disclosure provides a steering control device and method capable of preventing catch-up due to a limitation in motor capacity.

The disclosure also provides a steering control device and method capable of predicting the possibility of catch-up based on motor information and command information according to the rotation of the steering wheel.

In an aspect, the present embodiments may provide a steering control device for controlling a first motor generating steering feedback torque in response to rotation of a steering wheel and a second motor generating rack driving torque for moving a rack, comprising a calculation unit calculating allowed rack speed information regarding a rack speed allowed when driving the rack using the second motor, based on rack force information and preset second motor performance information and calculating catch-up prevention torque information for preventing catch-up in the steering wheel, based on the allowed rack speed information and command rack speed information generated to drive the rack at a speed in response to rotation of the steering wheel and a controller performing catch-up prevention control on the first motor based on the catch-up prevention torque information.

In another aspect, the present embodiments may provide a steering control method for controlling a first motor generating steering feedback torque in response to rotation of a steering wheel and a second motor generating rack driving torque for moving a rack, comprising an allowed rack speed information calculation step calculating allowed rack speed information regarding a rack speed allowed when driving the rack using the second motor, based on rack force information and preset second motor performance information, a catch-up prevention torque information calculation step calculating catch-up prevention torque information for preventing catch-up in the steering wheel based on command rack speed information generated to drive the rack at a speed in response to rotation of the steering wheel and the allowed rack speed information, and a catch-up prevention control step performing catch-up prevention control on the first motor based on the catch-up prevention torque information.

Effects of the Disclosure

According to the disclosure, it is possible to provide a steering control device and method capable of preventing catch-up due to a limitation in motor capacity.

According to the disclosure, it is possible to provide a steering control device and method capable of predicting the possibility of catch-up based on motor information and command information according to the rotation of the steering wheel.

DESCRIPTION OF DRAWINGS

The above and other objects, features, and advantages of the disclosure will be more clearly understood from the following detailed description, taken in conjunction with the accompanying drawings, in which:

FIG. 7 is a view illustrating an example configuration of using a lookup table in a steering control device according to an embodiment;

DETAILED DESCRIPTION

Figure 1:
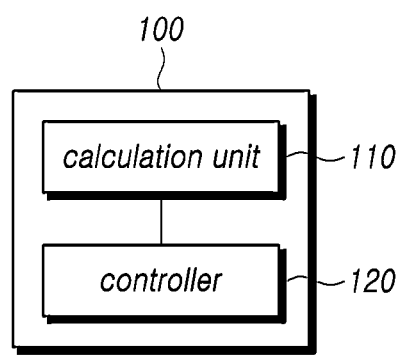
FIG. 1 is a block diagram illustrating a steering control device according to the disclosure.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a block diagram illustrating a steering control device according to the disclosure.

Referring to FIG. 1, a steering control device 100 according to the disclosure may include a calculation unit 110 and a controller 120. The calculation unit 110 and the controller 120 may be connected to each other.

As an example, the steering control device 100 may be a steering control device for controlling a first motor generating steering feedback torque in response to rotation of a steering wheel and a second motor generating rack driving torque for moving a rack. The steering control device 100 may include a calculation unit 110 calculating allowed rack speed information regarding a rack speed allowed when driving the rack using the second motor, based on rack force information and preset second motor performance information and calculating catch-up prevention torque information for preventing catch-up in the steering wheel, based on the allowed rack speed information and command rack speed information generated to drive the rack at a speed in response to rotation of the steering wheel and a controller 120 performing catch-up prevention control on the first motor based on the catch-up prevention torque information.

The calculation unit 110 may calculate catch-up prevention torque information for preventing catch-up in the steering wheel and allowed rack speed information regarding a rack speed allowed when driving the rack using the second motor.

As an example, the calculation unit 110 may calculate the allowed rack speed information based on rack force information and second motor performance information.

Specifically, the calculation unit 110 may calculate corresponding motor torque information and corresponding motor speed information corresponding to the rack force information based on the second motor performance information and calculate the allowed rack speed information based on the corresponding motor torque information and the corresponding motor speed information.

The second motor performance information may include rack force-motor torque information, motor torque-motor speed information, and rack speed-damping torque information. Further, the reaction force-motor torque information may include first lookup table information, the motor torque-motor speed information may include second lookup table information, and the rack speed-damping torque information may include third lookup table information.

As an example, the first lookup table information may include information regarding a first lookup table storing motor torque values respectively corresponding to rack force values by using the rack force values as their respective indexes.

Specifically, when the first lookup table information is used, a specific rack force value may be used as an index to calculate its corresponding motor torque value, or a specific motor torque value may be used as an index to calculate its corresponding rack force value.

As another example, the second lookup table information may include information regarding a second lookup table storing motor speed values respectively corresponding to motor torque values by using the motor torque values as their respective indexes.

Specifically, when the second lookup table information is used, a specific motor torque value may be used as an index to calculate its corresponding motor speed value, or a specific motor speed value may be used as an index to calculate its corresponding motor force value.

As another example, the third lookup table information may include information regarding a third lookup table storing damping torque values respectively corresponding to rack speed values by using the rack speed values as their respective indexes.

Specifically, when the third lookup table information is used, a specific rack speed value and a specific rack speed difference value may be used as indexes to extract their corresponding damping torque values and calculate the damping torque information based on the extracted damping torque values.

The second motor performance information and information included therein are described below in greater detail with reference to FIGS. 6 and 7.

The calculation unit 110 may calculate the corresponding motor torque information based on the rack force information and the rack force-motor torque information. For example, the calculation unit 110 may calculate the corresponding motor torque information based on the first lookup table information included in the rack force information and the rack force-motor torque information.

Alternatively, when the rack force-motor torque information is information in the form of a graph regarding the relationship between rack force and motor torque or an equation for outputting the motor torque value by inputting the rack force value, the calculation unit 110 may calculate the motor torque value corresponding to the rack force value of the rack force information in the graph or the equation and calculate the calculated motor torque value as the corresponding motor torque information.

The calculation unit 110 may calculate the corresponding motor speed information based on the corresponding motor torque information and the motor torque-motor speed information. For example, the calculation unit 110 may calculate the corresponding motor speed information based on the second lookup table information included in the corresponding motor torque information and motor torque-motor speed information.

Alternatively, when the motor torque-motor speed information is information in the form of a graph regarding the relationship between motor force and motor speed or an equation for outputting the motor speed value by inputting the motor torque value, the calculation unit 110 may calculate the motor torque value corresponding to the rack force value of the rack force information in the graph or the equation and calculate the calculated motor torque value as the corresponding motor torque information.

The calculation unit 110 may calculate the allowed rack speed information based on the corresponding motor speed information. Specifically, it may be calculated in such a manner as to calculate the corresponding rack speed when the second motor is driven at the corresponding motor speed based on the relationship between the motor speed of the second motor and the rack speed.

For example, the calculation unit 110 may calculate the allowed rack speed information by multiplying the corresponding motor speed information by a preset gear constant. Alternatively, the calculation unit 110 may calculate the allowed rack speed information using a lookup table storing the rack speed values respectively corresponding to motor speed values.

Only one of the gear constant-based calculation method and the lookup table-based calculation method may be used to calculate the allowed rack speed information, or both the methods may be used to calculate their respective pieces of allowed rack speed information, based on which the final allowed rack speed may be calculated. Based on the results of calculation by both the methods, the average of the results may be calculated as the allowed rack speed. Or, the smaller of the two calculation results may be calculated as the allowed rack speed.

For example, a condition for selection may be arbitrarily chosen by the user. Or, as the selection condition, when it is determined that additional information other than the corresponding motor speed information needs to be considered for the driving state of the vehicle, the lookup table-based method is selected and, when it is determined that no additional information is needed, the gear constant-based method is selected.

When the rack force information is preset threshold thrust information, the calculation unit 110 may calculate preset threshold rack speed information as the allowed rack speed information.

Typically, the relationship between motor torque and motor speed in the motor torque-motor speed graph may be defined as an inverse-proportional relationship in which as the motor torque increases, the motor speed reduces.

However, as an exception, there may be a range in which the motor speed has a predetermined value in all cases where the motor torque is a predetermined value or less and a range in which the motor torque has a predetermined value in all cases where the motor speed is a predetermined value or less.

The threshold thrust information may be set to the rack force value at the point where the motor torque value corresponding to the motor speed value and the rack force value corresponding to the motor torque value are largest in the range where the motor speed value does not increase below a predetermined value even when the motor torque value increases in the motor torque-motor speed graph.

In this case, in the motor torque-motor speed graph, the motor speed value corresponding to the threshold thrust information is obtained, and the threshold rack speed information may be set as the rack speed value corresponding to the motor speed value based on the relationship between motor speed and rack speed.

In summary, when the threshold thrust information and the threshold rack speed information are preset, if the rack force is the threshold thrust information or more, the threshold rack speed information may be calculated as the allowed rack speed information without the need for a separate, complicated calculation process. Thus, the overall allowed rack speed information calculation rate may be enhanced.

As another example, the calculation unit 110 may calculate the catch-up prevention torque information based on the command rack speed information and the allowed rack speed information. Here, catch-up prevention torque may mean the motor torque that is generated by the first motor to prevent catch-up when driving the second motor and the rack based on a command generated in excess of the capacity limit of the second motor.

The catch-up prevention torque information may be calculated by calculating damping torque information based on the command rack speed information and the allowed rack speed information and adding the damping torque information and steering feedback torque calculated according to the conventional logic which does not consider catch-up.

First, the calculation unit 110 may calculate the damping torque information based on the command rack speed information, the allowed rack speed information, and the rack speed-damping torque information. The damping torque information may include third lookup table information storing damping torque values respectively corresponding to rack speed values by using the rack speed values as their respective indexes.

Typically, catch-up may occur when driving the second motor and the rack based on a command in excess of the capacity limit of the second motor. Therefore, in a case where the command rack speed information exceeds the allowed rack speed information, if the second motor and the rack are driven based on the command rack speed information, it may be determined that catch-up is likely.

In this regard, the calculation unit 110 may calculate rack speed difference information regarding the difference in size between the command rack speed information and the allowed rack speed information. In this case, the rack speed difference information may be calculated by the equation: "rack speed difference information=command rack speed−allowed rack speed."

Specifically, when rack speed difference information ≥0, driving the second motor and the rack based on the command rack speed information may result in catch-up so that the controller 120 may be configured to perform catch-up prevention control. In contrast, when rack speed difference information <0, catch-up is less likely to occur, so that the controller 120 may be configured not to perform catch-up prevention control.

Meanwhile, although the difference in rack speed between the command rack speed and the allowed rack speed remains the same, the size of the damping torque and catch-up prevention torque to prevent catch-up according to the size of the motor torque may vary.

Given this, the rack speed-damping torque information and the third lookup table information included therein may be configured in the form of calculating damping torque information considering both the allowed rack speed information and the rack speed difference information.

For example, when the allowed rack speed information is 0.5 m/s, and the command rack speed information is 0.7 m/s, the rack speed difference information may be calculated as 0.2 m/s, in which case the third lookup table information may be set so that the damping torque information is calculated as 1.1 Nm.

When the rotational angle sensing information is 2.0 m/s, and the command rack speed information is 2.2 m/s, the rack speed difference information may be calculated as 0.2 m/s and, in this case, the third lookup table information may be set so that the damping torque information is calculated as 2.1 Nm.

As such, if the allowed rack speed information and the command rack speed information are large although the rack speed difference information is the same as 0.2 m/s in calculating the third lookup table information, the size of the damping torque information may be set to be calculated as relatively large and, if the sizes of the allowed rack speed information and the command rack speed information are small, the size of the damping torque information may be set to be calculated as relatively small.

In sum, the calculation unit 110 may calculate the damping torque information considering both the allowed rack speed information and the rack speed difference information in setting the rack speed-damping torque information and the third lookup table information.

The calculation unit 110 may calculate the catch-up prevention torque information based on the steering feedback torque and the damping torque information.

Here, the steering feedback torque refers to the torque generated by the first motor to transfer the steering feel in response to the rotation of the steering wheel and may include both steering assist torque and steering reaction force torque.

The steering feedback torque may include one set to be generated by the conventional logic. Here, the conventional logic may encompass any conventional logic regarding calculation and control of steering feedback torque which does not take catch-up into consideration.

Specifically, the calculation unit 110 may calculate catch-up prevention torque information based on the steering feedback torque calculated according to the conventional logic and the damping torque information calculated according to the disclosure. For example, the catch-up prevention torque may be calculated by adding the size of the steering feedback torque and the size of the damping torque.

In general, catch-up occurs when the second motor and the rack are driven at smaller motor torque and smaller rack speed due to the capacity limit of the second motor. Thus, the catch-up prevention torque may be calculated as larger than the steering feedback torque, giving a relatively heavier steering feel. In other words, the damping torque which is added to the steering feedback torque may be calculated as a torque value in the same direction as the steering feedback torque.

The calculation unit 110 may set a deadband upper limit and a deadband lower limit based on the allowed rack speed information, calculating deadband range information. In this case, the deadband range set based on the deadband range information may be set to a range not more than the deadband upper limit and not less than the deadband lower limit.

In some cases, the vehicle steering control may be continuously performed in a range close to the allowed rack speed according to the capacity limit of the second motor.

In this case, if calculation of catch-up prevention torque and determination of whether to control catch-up prevention control are performed only on a specific value according to the performance information about the second motor, such calculation and control may be too frequent, negatively affecting steering control efficiency.

To address this issue, the deadband range information is calculated based on the allowed rack speed information, and calculation of catch-up prevention torque and determination of whether to perform catch-up prevention control are performed based on the deadband range information. Thus, it is possible to enhance the efficiency of catch-up prevention control and increasing the stability of steering control.

The controller 120 may perform catch-up prevention control on the first motor based on the catch-up prevention torque information. In this case, the catch-up prevention control may include controlling to generate catch-up prevention torque in the first motor based on the catch-up prevention torque information.

The controller 120 may control to perform catch-up prevention control when a preset condition is met.

As an example, the controller 120 may perform catch-up prevention control when the rack speed difference information is a preset reference speed difference or more. Here, the reference speed difference may be set to a predetermined specific value or be set based on the allowed rack speed information.

For example, the reference speed difference may be set to a specific value, e.g., 0.1 m/s. In this case, if the allowed rack speed information is 1.0 m/s, then when the command rack speed information is 1.1 m/s or more, the rack speed difference information is larger than the reference speed difference 0.1 m/s, so that catch-up prevention control may be performed. If the allowed rack speed information is 2.0 m/s, then when the command rack speed information is 2.1 m/s or more, the rack speed difference information is 0.1 m/s or more, so that catch-up prevention control may be performed.

As another example, the reference speed difference may be set to a size corresponding to 10% of the allowed rack speed information, based on the allowed rack speed information. In this case, when the allowed rack speed is 1.0 m/s, the reference speed difference is 0.1 m/s and, when the allowed rack speed is 2.0 m/s, the reference speed difference is 0.2 m/s and, based thereupon, it may be compared with the rack speed difference information to determine whether to perform catch-up prevention control.

The two methods regarding the reference speed difference setting are compared. The method of setting the reference speed difference to a specific value is simple in computation and allows for quick determination as to whether to perform catch-up prevention control, providing advantages in light of control speed. The method of setting the reference speed difference as a proportion of the allowed rack speed information may calculate a more appropriate reference speed difference according to the size of the allowed rack speed information and thus more accurately determine whether to perform catch-up prevention control and thus has advantages in light of control accuracy.

The controller 120 may perform catch-up prevention control when the command rack speed information falls outside the deadband range of the deadband range information. As an example, when the deadband range is set to a range not more than the deadband upper limit and not less than the deadband lower limit, the controller 120 may perform catch-up prevention control when the command rack speed information exceeds the deadband upper limit or is less than the deadband lower limit. In other words, a configuration for performing deadband processing may be added to determining whether to start/end catch-up prevention control.

For example, when the allowed rack speed information is calculated as 1.0 m/s, the size of the deadband range may be set to 0.2 m/s, and the deadband upper limit and the deadband lower limit may be set to 1.2 m/s and 1.0 m/s, respectively, to calculate the deadband range information.

In this case, when the allowed rack speed information is 1.0 m/s, and the command rack speed information is 1.1 m/s, it may be determined to fall within the range of the deadband range information, so that catch-up prevention control may not be performed.

In this case, when the allowed rack speed information is 1.0 m/s, and the command rack speed information is 1.3 m/s, it may be determined to fall outside the range of the deadband range information, so that catch-up prevention control may be performed.

In some cases, in a case where the command rack speed information is determined to exceed the deadband upper limit so that catch-up prevention control is initiated, if the command rack speed information is reduced to be less than the deadband upper limit but not less than the deadband lower limit, catch-up prevention control may be terminated only when the command rack speed information is reduced to be less than the deadband lower limit although the catch-up prevention control lasts.

Such deadband processing may prevent frequent switch between the start/end of catch-up prevention control even when the situation where the command rack speed information approaches and crosses the allowed rack speed information last. Accordingly, it is possible to minimize inefficiency due to the start/end itself of catch-up prevention control while increasing the stability of steering control.

Figure 2:
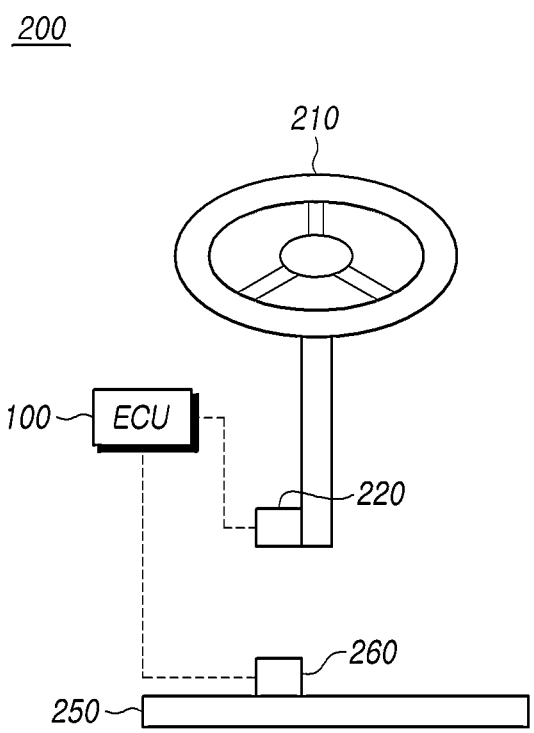
FIG. 2 is a view illustrating an example configuration of a vehicle steering device according to an embodiment.

FIG. 2 is a view illustrating an example configuration of a vehicle steering device according to an embodiment.

Referring to FIG. 2, a steering device 200 according to an embodiment may include at least one of a steering control device 100, a steering wheel 210, a first motor 220, a rack 250, and a second motor 260. The steering wheel 210 and the first motor 220, and the rack 250 and the second motor 260 may be components physically separated from each other.

The steering device 200 according to an embodiment may be steer-by-wire device that includes a first actuator connected with the steering wheel and generating steering feedback torque using the first motor and a second actuator that is mechanically separated from the first actuator, is connected with the rack, and generates rack driving torque using the second motor.

In this case, the first actuator may include any other components, necessary to operate the upper end of the steering device 200, such as a component for operating the steering wheel 210 and the first motor 220 or producing and transmitting information according to the operation and a component for producing, generating, and transferring the steering torque and steering feedback torque, as well as the steering wheel 210 and the first motor 220.

The second actuator may include any other components, necessary for operating the lower end of the steering device 200, such as a component for operating the rack 250 and the second motor 260 or producing and transmitting information according to the operation and a component for producing, generating, and transferring the rack driving torque, as well as the rack 250 and the second motor 260.

The steering wheel 210 is a component included in the upper end of the steering device and may include any component that generates variations in steering angle and steering torque in the steering device through rotation of the steering wheel 210.

The first motor 220 is a component included in the upper end of the steering device to generate steering feedback torque in response to rotation of the steering wheel 210 and, in some cases, may include any motor classified as a steering feedback motor, a steering assist motor, or a steering reaction force motor.

The rack 250 is a component included in the lower end of the steering device and may any component that generates, e.g., variations in steering angle and steering torque to the wheels through movement of the rack 250.

The second motor 260 is a component included in the lower end of the steering device to generate rack driving torque based on information regarding, e.g., variations in steering angle and steering torque received from the upper end of the steering device and, in some cases, may include any motor classified as a rack motor or a rack driving motor.

The above-described steering device 200 may be equipped with the steering control device 100 according to the disclosure and each component thereof may be controlled by the steering control device 100. The above description may be applicable to the steering device described below in connection with FIGS. 3 to 7.

Figure 3:
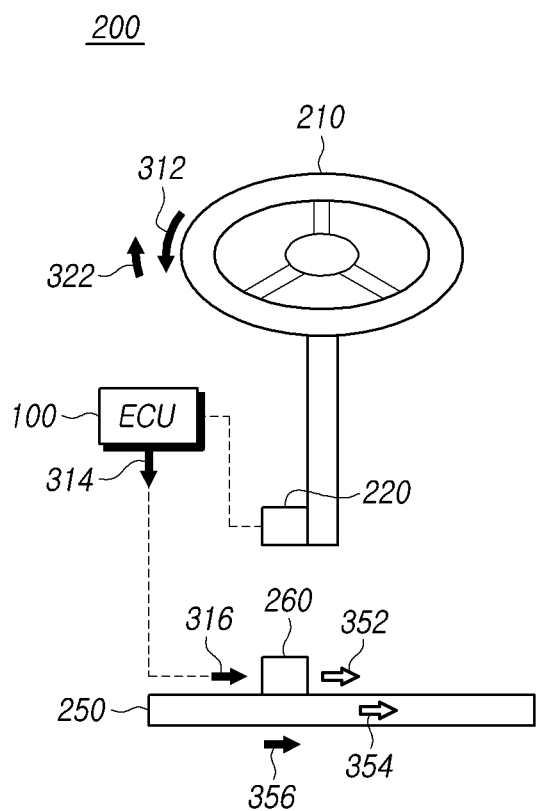
FIG. 3 is a graph illustrating an example configuration of operating a steering control device in a vehicle steering device according to an embodiment.

FIG. 3 is a graph illustrating an example configuration of operating a steering control device in a vehicle steering device according to an embodiment.

Referring to FIG. 3, the steering control device 100 may control to operate the rack 250 and the second motor 260 in response to rotation of the steering wheel 210 and control to generate steering feedback torque in the first motor 220.

Specifically, as the steering wheel 210 is rotated, the steering torque 312 may be generated, and a command for moving the rack may be generated according to, and in response to, the size of the steering torque 312 and rotation of the steering wheel 210, so that a command rack speed 314 and command second motor torque 316 may be calculated.

Next, the steering control device 100 may control to generate motor torque in the second motor based on the command second motor torque 316, thus controlling to rotate the second motor 260 at a second motor speed 352.

Then, the steering control device 100 may control the rack 250 to move at the rack speed 354 based on the operation of the second motor 260. In this case, the size of the rack speed 354 may be calculated or estimated as the product of the second motor speed 352 and a preset gear constant.

Thereafter, when the rack 250 is moved at the rack speed 354 by the second motor 260, the reaction force 356 applied to the rack 250 may be calculated. The reaction force 356 may be calculated by direct measurement using a sensor or may be calculated by estimation using the motor torque and motor speed of the second motor 260 and the rack speed of the rack 250.

Then, the steering control device 100 may control to generate the steering feedback torque 322 in the first motor 220 based on the rack speed 354 or the rack force 356.

Figure 4:
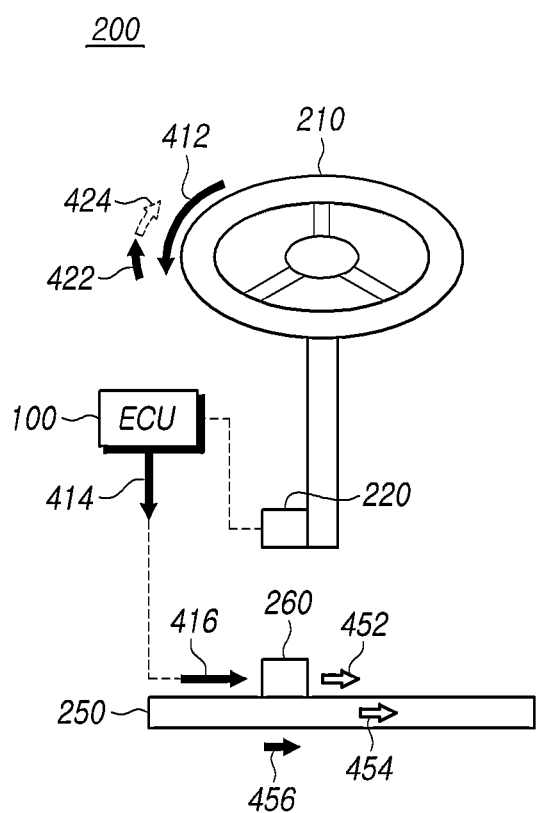
FIG. 4 is a graph illustrating an example of catch-up in a vehicle steering device according to an embodiment.
Figure 5:
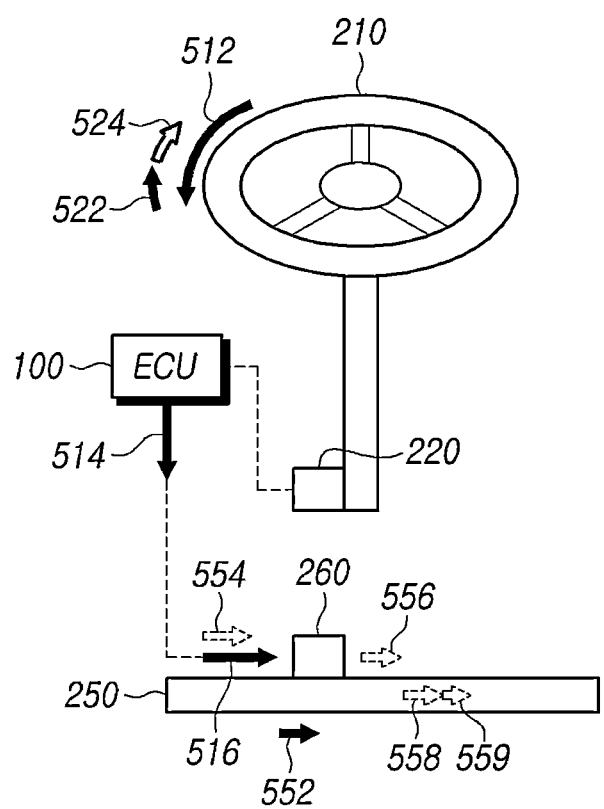
FIG. 5 is a graph illustrating an example configuration of performing catch-up prevention control in a vehicle steering device according to an embodiment.

The above-described control related to generation of the steering torque 312 according to rotation of the steering wheel 210, generation of the command rack speed 314 and command second motor torque 316, calculation and generation of the second motor speed 352, rack speed 354, and rack force 356, and generation of the steering feedback torque 322, except for catch-up prevention control, may likewise apply to FIGS. 4 and 5.

FIG. 4 is a graph illustrating an example of catch-up in a vehicle steering device according to an embodiment.

Referring to FIG. 4, when relatively large steering torque 412 is generated due to, e.g., abrupt rotation of the steering wheel 210, so that a command exceeding the capacity limit of the second motor 260 is generated, steering feedback torque with a smaller size than the size corresponding to the rotation of the steering wheel 210 may result, causing catch-up.

Specifically, when the steering wheel 210 is abruptly rotated at a predetermined speed or more, the resultant steering torque 412 may be a predetermined size or more, and thus, a large command rack speed 414 and command second motor torque 416 may be generated accordingly.

The command rack speed 414 and the command second motor torque 416 may exceed the performance of the second motor 260. if the second motor 260 is controlled to be operated based on the command exceeding the performance of the second motor, the second motor 260 may operate only within its performance limit range.

Accordingly, when driving the second motor 260 and operating the rack 250 according to the command rack speed 414 and the command second motor torque 416, the second motor speed 452, the rack speed 454, and the rack force 456 may be generated as less than calculated values according to the command.

As such, if the rack speed 454 and the rack force 456 are generated as less than the calculated values according to the command, the size of the steering feedback torque 422 calculated based on the rack speed 454 and the rack force 456 may also be smaller than the size corresponding to the command.

Resultantly, in the steering control device 100 according to an embodiment, a relatively large steering torque 412 is generated due to abrupt rotation of the steering wheel 210 at a predetermined speed or more, and the resultant rack 250 driving exceeds the capacity limit of the second motor 260, so that a smaller size of steering feedback torque 422 than the size corresponding to the rotation of the steering wheel 210 is generated, causing catch-up which results in the user feeling a reaction force and failing to steer at a desired speed.

In this case, in relation to the steering feedback torque 422, the size of the torque corresponding to the rotation of the steering wheel 210 may be the sum of the steering feedback torque 422 and the catch-up torque 424.

In other words, when a relatively large size of steering torque 412 is generated due to rotation of the steering wheel 210, it is possible to prevent catch-up by generating as much torque as the sum of the steering feedback torque 422 and the catch-up torque 424 in the first motor.

FIG. 5 is a graph illustrating an example configuration of performing catch-up prevention control in a vehicle steering device according to an embodiment.

Referring to FIG. 5, when relatively large steering torque 512 is generated due to, e.g., abrupt rotation of the steering wheel 210, so that a command exceeding the capacity limit of the second motor 260 is generated, it is possible to prevent catch-up by calculating an allowed rack speed 558 based on the second motor performance information and controlling to generate catch-up prevention torque in the first motor 220 based thereupon, unlike in FIG. 4.

Specifically, when the steering wheel 210 is abruptly rotated at a predetermined speed or more, the resultant steering torque 512 may be a predetermined size or more, and thus, a large command rack speed 514 and command second motor torque 516 may be generated accordingly.

However, unlike in the embodiment of FIG. 4, in which the rack 250 and the second motor 260 are immediately driven based on the command rack speed 514 and the command second motor torque 516, the steering control device 100 may determine whether the command rack speed 514 is a command exceeding the capacity limit of the second motor, calculate the portion resultant from excess of the capacity limit of the second motor as damping torque, and add it to the steering feedback torque to thereby generate catch-up prevention torque, thereby preventing catch-up.

For example, the steering control device 100 may calculate the allowed rack speed information based on previous rack force information 552 and second motor performance information. Here, the previous rack force information 552 may include information storing the value estimated or measured for the rack force which was exerted to the rack 250 before the steering torque 512 and the command rack speed 514 are generated.

Specifically, the steering control device 100 may calculate the allowed second motor torque 554 based on the previous rack force information 552 and the second motor performance information. For example, it is possible to calculate the allowed second motor torque 554 regarding the motor torque allowed due to the capacity limit of the second motor when the rack force of the size corresponding to the previous rack force information 552 is applied to the rack 250 based on the previous rack force information 552 and the first lookup table information. Further, the allowed second motor torque 554 may be calculated as corresponding motor torque information.

Next, the steering control device 100 may calculate the corresponding motor speed information based on the corresponding motor torque information and the second motor performance information. For example, it is possible to calculate the allowed second motor speed 556 regarding the motor speed allowed due to the capacity limit of the second motor when the motor torque of the size corresponding to the allowed second motor torque 554 is applied to the second motor based on the allowed second motor torque 554 and the second lookup table information. Further, the allowed second motor speed 556 may be calculated as corresponding motor speed information.

Here, the allowed second motor torque 554 and corresponding motor torque information, and the allowed second motor speed 556 and corresponding motor speed information may be information calculated for use in the process of calculating the allowed rack speed information to predict whether catch-up occurs before actually driving the rack 250 and the second motor 260.

Next, the steering control device 100 may calculate the allowed rack speed 558 based on the corresponding motor speed information and the preset gear constant. Further, the rack speed difference 559 may be calculated by calculating the size difference between the command rack speed 514 and the allowed rack speed 558.

Then, the steering control device 100 may calculate the damping torque 524 based on the command rack speed 514, allowed rack speed 558, rack speed difference 559, and third lookup table information. For example, the damping torque 524 may be calculated in such a manner as to find the value corresponding to the allowed rack speed 558 from the allowed rack speed index of the third lookup table, find the value corresponding to the rack speed difference 559 from the rack speed difference index of the third lookup table, and extract the damping torque value stored in the corresponding position.

Then, the steering control device 100 may calculate the catch-up prevention torque by adding the damping torque 524 to the size of the steering feedback torque 522 calculated by the conventional logic and control to generate the torque corresponding to the catch-up prevention torque in the first motor 220, preventing catch-up prevention control.

The catch-up prevention control may be performed when meeting the condition that the rack speed difference 559 regarding the difference between the command rack speed 514 and the allowed rack speed 558 is preset reference speed difference information or more.

Or, the deadband range information including the deadband upper limit and the deadband lower limit may be calculated and, while catch-up prevention control is not performed, catch-up prevention control may be controlled to be performed when meeting the condition that the command rack speed 514 exceeds the deadband upper limit and, while catch-up prevention control is performed, catch-up prevention control may be controlled to be terminated when meeting the condition that the command rack speed 514 is less than the deadband lower limit.

As such, as catch-up prevention control is rendered to be performed when meeting a preset condition regarding catch-up prevention control using the reference speed difference or deadband range information, it is possible to enhance the control efficiency of the steering control device 100 and further increase the stability of steering control and catch-up prevention control.

As described above in connection with FIG. 5, the steering control device 100 according to the disclosure may predict whether the size of the command rack speed 514 generated due to, e.g., abrupt rotation of the steering wheel 210 is a command exceeding the performance of the second motor, pre-calculate the damping torque 524 and the allowed rack speed 558 before driving the rack 250 and the second motor 260, and control to generate catch-up prevention torque in the first motor 260 using the same.

In other words, the possibility of catch-up is determined by comparing the command information and second motor performance information and, if it is determined that there is a possibility that catch-up occurs, pre-treatment of performing catch-up prevention control is possible. Thus, as compared with post-treatment on catch-up, it is possible to address unstable steering and inefficient steering control that may arise when removing catch-up.

Figure 6:
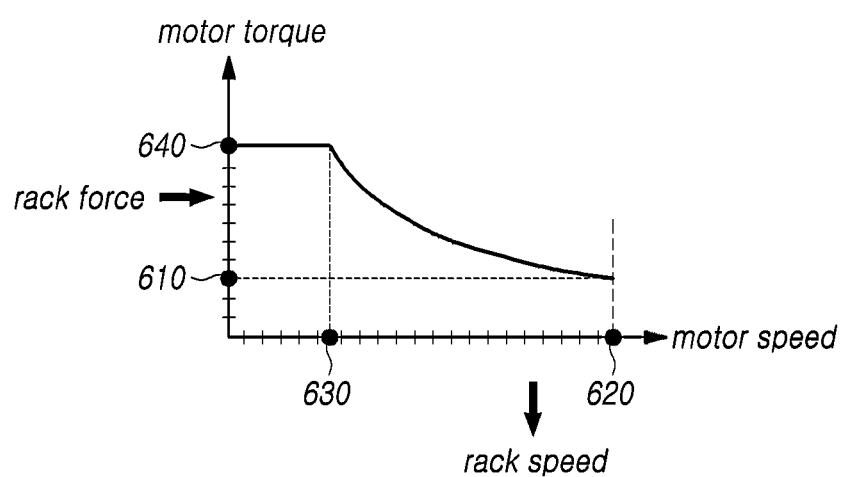
FIG. 6 is a graph illustrating an example configuration of using second motor performance information of a steering control device according to an embodiment.

FIG. 6 is a graph illustrating an example configuration of using second motor performance information of a steering control device according to an embodiment.

Referring to FIG. 6, the second motor performance information about the steering control device according to an embodiment may include information regarding performance in designing the second motor. In this case, the information regarding the performance of the second motor may include not only information regarding motor torque and motor speed but also information regarding rack force and rack speed that may affect the performance of the second motor when the second motor is connected with the rack.

Specifically, the second motor performance information may be in the form of a graph as shown in FIG. 6 or a lookup table as shown in FIG. 7 or may be an equation that may output an output value in response to entry of an input value.

As an example, the second motor performance information may include rack force-motor torque information regarding the relationship between the rack force and motor torque of the second motor.

Specifically, the rack force-motor torque information may include information indicating the relationship with the reaction force value applied to the rack when motor torque corresponding to a specific motor torque value is applied to the second motor in the steering device in which the second motor and the rack are connected. In other words, there may be included information in the form of being capable of calculating the rack force value corresponding to the motor torque value of the second motor or the motor torque value of the second motor corresponding to the rack force value of the rack.

The rack force-motor torque information may be information in the form of a graph having a reaction force axis and a motor torque axis. Or, the rack force-motor torque information may be information in the form of a table having the reaction force and the motor torque, respectively, as indexes. As described below in connection with FIG. 7, to be distinguished from other lookup table information, the lookup table of the rack force-motor torque information may be set as first lookup table information.

As another example, the second motor performance information may include motor torque-motor speed information regarding the T-N curve of the second motor. Here, the T-N curve is information regarding the relationship between the motor torque and the number of cycles, where the number of cycles may include information regarding revolutions per minute (RPM), i.e., information regarding the rotation speed of the motor.

Specifically, the motor torque-motor speed information may be information representing the relationship between the motor torque and motor speed of the second motor in the form of a graph. For example, the motor torque-motor speed information may be information in the form of a graph having the motor torque as the x axis and the motor speed as the y axis.

Or, the motor torque-motor speed information may be information representing a lookup table storing motor speed values respectively corresponding to motor torque values by using the motor torque value of the second motor as the index. As described below in connection with FIG. 7, to be distinguished from other lookup table information, the lookup table of the motor torque-motor speed information may be set as second lookup table information.

As another example, the second motor performance information may include rack speed-damping torque information regarding the relationship between the rack speed and damping torque of the second motor.

Specifically, the rack speed-damping torque information may be information representing a lookup table having the command rack speed and the allowed rack speed as the indexes and storing the corresponding damping torque values. Or, the rack speed-damping torque information may be information in the form of a table using the allowed rack speed and the rack speed difference, respectively, as indexes and storing their respective damping torque values.

Or, the rack speed-damping torque information may be information representing a lookup table using the allowed rack speed as one index and the rack speed difference regarding the size difference between the command rack speed and the allowed rack speed as the other index and storing damping torque values corresponding thereto.

As another example, the rack speed-damping torque information may be information in the form of a graph having the allowed rack speed, rack speed difference, and damping torque as their respective axes. As described below in connection with FIG. 7, to be distinguished from other lookup table information, the lookup table of the rack speed-damping torque information may be set as third lookup table information.

Meanwhile, the steering control device 100 according to an embodiment may calculate the motor torque-motor speed information based on the motor torque-motor speed graph of FIG. 6 and calculate the motor speed value corresponding to a specific motor torque value or the motor torque value corresponding to a specific motor speed value using the information.

Further, the steering control device 100 may calculate the rack force-motor torque information based on the motor torque-motor speed graph of FIG. 6 and the relationship between motor torque and rack force of the second motor and calculate the motor speed-rack speed information based on the motor torque-motor speed graph of FIG. 6 and the relationship between the motor speed and rack speed of the second motor.

As an example, the information regarding the relationship with the motor torque value corresponding to the specific rack force value may be represented with respect to the Y axis of the graph shown in FIG. 6. In other words, when the rack force corresponding to the specific rack force value is applied as a case in which the torque corresponding to the specific motor torque value is generated, so that the rack is operated, the rack force-motor torque information may be calculated using the correlation between the specific motor torque value and the specific rack force value.

As another example, the information regarding the rack speed value corresponding to the specific motor speed value may be represented with respect to the X axis of the graph shown in FIG. 6. In other words, when the rack speed corresponding to the specific rack speed value is generated as a case in which the second motor is operated at the speed corresponding to the specific motor speed value, so that the rack is operated, the motor speed-rack speed information may be calculated using the correlation between the specific motor speed value and the specific rack speed value.

The steering control device 100 may calculate the motor torque value corresponding to the specific rack force value, the motor speed value corresponding to the specific motor torque value, and the rack speed value corresponding to the specific motor speed value by comprehensively considering the graph of FIG. 6, the motor torque-motor speed relationship, and the resultant rack force-motor torque relationship and motor speed-rack speed relationship.

In this regard, specifically referring to the graph of FIG. 6, the relationship between the motor torque and motor speed of the second motor may be defined as an inverse-proportional relationship in which as the motor torque increases, the motor speed reduces.

However, in the graph of FIG. 6, as an exception, there may be a range in which the motor speed has a predetermined value in all cases where the motor torque is a predetermined value or less and a range in which the motor torque has a predetermined value in all cases where the motor speed is a predetermined value or less.

Given the exceptional range, when the rack force information is preset threshold thrust information 610, the calculation unit 110 may calculate preset threshold rack speed information 620 as the allowed rack speed information.

The threshold thrust information 610 may be set to the rack force value at the point where the motor torque value corresponding to the motor speed value and the rack force value corresponding to the motor torque value are largest in the range not less than the threshold motor speed information 620, where the motor speed value does not increase below a predetermined value even when the motor torque value increases in the graph of FIG. 6.

In this case, the motor speed value corresponding to the threshold thrust information 610 is obtained, and the threshold rack speed information 620 may be set as the rack speed value corresponding to the motor speed value based on the relationship between motor speed and rack speed.

In summary, when the threshold thrust information 610 and the threshold rack speed information 620 are preset, if the rack force is the threshold thrust information or more, the threshold rack speed information may be calculated as the allowed rack speed information without the need for a separate, complicated calculation process. Thus, the overall allowed rack speed information calculation rate may be enhanced.

Further, in the graph of FIG. 6, it is possible to calculate preset second threshold rack force information 640 as the rack force information when the rack speed information is not more than preset second threshold rack speed information 630 by using another exceptional range, i.e., a range in which the motor torque has a predetermined value in all cases where the motor speed is a predetermined value or less, in the graph of FIG. 6.

FIG. 7 is a view illustrating an example configuration of using a lookup table in a steering control device according to an embodiment.

Referring to FIG. 7, the second motor performance information is information regarding the relationship between at least two or more pieces of information and may include information in the form of a lookup table that uses a specific value regarding at least one or more pieces of information among them as the index and stores the specific value corresponding to the remaining information.

Specifically, when each of the rack force-motor torque information, the motor torque-motor speed information, and the rack speed-damping torque information is implemented as one lookup table, the rack force-motor torque information, the motor torque-motor speed information, and the rack speed-damping torque information may be defined as the first lookup table information, the second lookup table information, and the third lookup table information, respectively, to distinguish the lookup tables.

As an example, the first lookup table information may include information regarding a first lookup table storing motor torque values respectively corresponding to rack force values by using the rack force values as their respective indexes.

Specifically, when the first lookup table information is used, a specific rack force value may be used as an index to calculate its corresponding motor torque value, or a specific motor torque value may be used as an index to calculate its corresponding rack force value.

As another example, the second lookup table information may include information regarding a second lookup table storing motor speed values respectively corresponding to motor torque values by using the motor torque values as their respective indexes.

Specifically, when the second lookup table information is used, a specific motor torque value may be used as an index to calculate its corresponding motor speed value, or a specific motor speed value may be used as an index to calculate its corresponding motor force value.

As another example, the third lookup table information may include information regarding a third lookup table storing damping torque values respectively corresponding to rack speed values by using the rack speed values as their respective indexes.

Specifically, when the third lookup table information is used, a specific rack speed value and a specific rack speed difference value may be used as indexes to calculate the damping torque value corresponding thereto.

In summary, in calculating the motor torque, motor speed, and damping torque in the steering control device according to the disclosure, each calculation using the calculation equation regarding the input/output relationship for each required information may undergo the computational process using each calculation equation, or necessary values may be calculated using the lookup table information as shown in FIG. 7.

As such, it is possible to enhance the rate of calculating the values required in catch-up prevention control by using the lookup tables in the calculation process according to the disclosure and thereby enhance substantial effects of catch-up prevention control.

In short, given that catch-up prevention torque should be calculated before generating steering feedback torque corresponding to the rotational state of the steering wheel to substantially exert catch-up prevention effects, it is possible to maximize the usefulness of the lookup table in the calculation process according to the disclosure.

The steering control device 100 is described again below in light of a method, and what has been described above is omitted as necessary, but is also applicable to the method.

Figure 8:
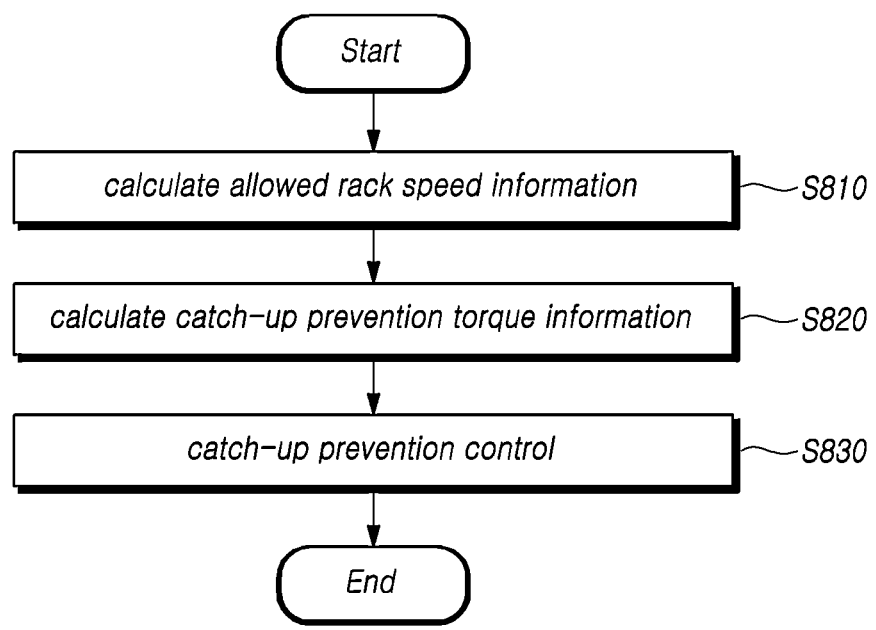
FIG. 8 is a flowchart illustrating a steering control method according to the disclosure.

FIG. 8 is a flowchart illustrating a steering control method according to the disclosure.

Referring to FIG. 8, a steering control method according to the disclosure may include an allowed rack speed information calculation step S810, a catch-up prevention torque information calculation step S820, and a catch-up prevention control step S830.

As an example, the steering control method is a steering control method for controlling a first motor generating steering feedback torque corresponding to rotation of a steering wheel and a second motor generating rack driving torque for moving a rack and may include an allowed rack speed information calculation step calculating allowed rack speed information regarding a rack speed allowed when driving the rack using the second motor, based on rack force information and preset second motor performance information, a catch-up prevention torque information calculation step calculating catch-up prevention torque information for preventing catch-up in the steering wheel based on command rack speed information generated to drive the rack at a speed corresponding to rotation of the steering wheel and the allowed rack speed information, and a catch-up prevention control step performing catch-up prevention control on the first motor based on the catch-up prevention torque information.

The allowed rack speed information calculation step S810 may include calculating the allowed rack speed information based on rack force information and second motor performance information.

Specifically, the allowed rack speed information calculations step S810 may include calculating corresponding motor torque information and corresponding motor speed information corresponding to the rack force information based on the second motor performance information and calculating the allowed rack speed information based on the corresponding motor torque information and the corresponding motor speed information.

For example, the allowed rack speed information calculation step S810 may include calculating the corresponding motor torque information based on the first lookup table information included in the rack force information and the rack force-motor torque information.

Next, the allowed rack speed information calculation step S810 may include calculating the corresponding motor speed information based on the second lookup table information included in the corresponding motor torque information and motor torque-motor speed information.

Next, in the allowed rack speed information calculation step S810, it may be calculated in such a manner as to calculate the corresponding rack speed when the second motor is driven at the corresponding motor speed based on the relationship between the motor speed of the second motor and the rack speed. For example, the allowed rack speed information calculation step S810 may include calculating the allowed rack speed information in such a manner as to multiply the corresponding motor speed information by a preset gear constant.

The catch-up prevention torque information calculation step S820 may include calculating the catch-up prevention torque information based on the command rack speed information and the allowed rack speed information.

Specifically, in the catch-up prevention torque information calculation step S820, the catch-up prevention torque information may be calculated by calculating damping torque information based on the command rack speed information and the allowed rack speed information and adding the damping torque information and steering feedback torque calculated according to the conventional logic which does not consider catch-up.

The catch-up prevention control step S830 may include performing catch-up prevention control on the first motor based on the catch-up prevention torque information. In this case, the catch-up prevention control may include controlling to generate catch-up prevention torque in the first motor based on the catch-up prevention torque information.

Further, in the catch-up prevention control step S830, catch-up prevention control may be performed when meeting a preset condition regarding one of the reference speed difference or deadband range information.

Figure 9:
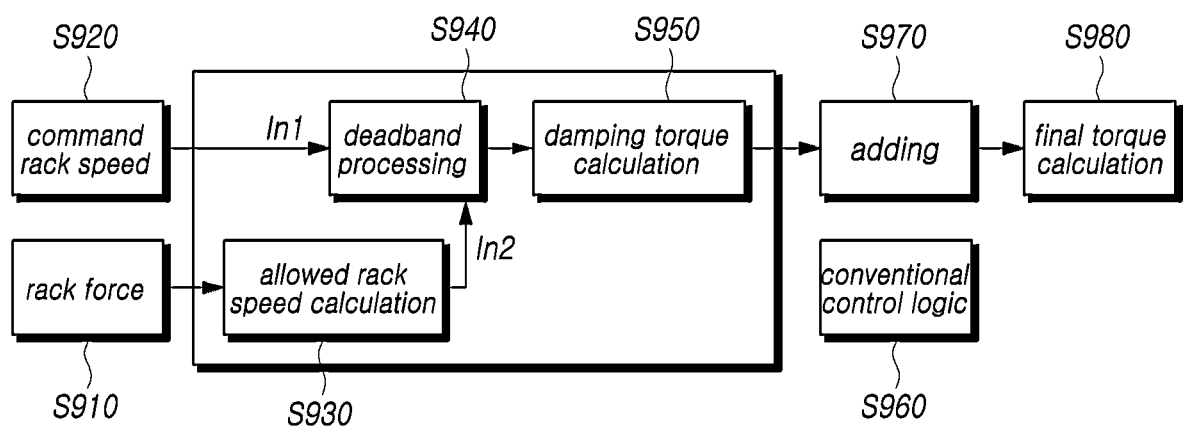
FIG. 9 is a flowchart illustrating an example process of computing final torque in a steering control method according to an embodiment.

FIG. 9 is a flowchart illustrating an example process of computing final torque in a steering control method according to an embodiment.

Referring to FIG. 9, the process of computing the final torque in the steering control method according to an embodiment may include a rack force input step S910, a command rack speed input step S920, an allowed rack speed calculation step S930, a deadband processing step S940, a damping torque calculation step S950, a conventional control logic performing step S960, an adding step S970, and a final torque calculation step S980.

The rack force input step S910 may include inputting rack force information previously measured or estimated to the steering control device 100.

The command rack speed input step S920 may include inputting command rack speed information generated in response to rotation of the steering wheel to the steering control device 100.

The allowed rack speed calculation step S930 may include calculating the allowed rack speed information based on rack force information and command rack speed information. In this case, the calculation of the allowed rack speed information may be performed based on the second motor performance information regarding the performance in designing the second motor.

The second motor performance information may include information regarding the T-N curve of the second motor. In other words, the allowed rack speed information may be calculated based on the T-N curve of the second motor.

The deadband processing step S940 may set a deadband including a deadband upper limit and a deadband lower limit based on the allowed rack speed information and determine whether to perform catch-up prevention control based on whether the command rack speed information falls outside the deadband through deadband processing.

Specifically, the deadband processing step S940 may include starting catch-up prevention control when the command rack speed information exceeds the deadband upper limit while catch-up prevention control is not performed and terminating catch-up prevention control when the command rack speed information is less than the deadband lower limit while the catch-up prevention control is performed.

The damping torque calculation step S950 may include calculating damping torque information based on the command rack speed, allowed rack speed information, and rack speed-damping torque information when meeting the condition for performing catch-up prevention control as a result of the deadband processing.

For example, damping torque information may be calculated in such a manner as to find the value corresponding to the allowed rack speed and rack speed difference information from the index of the preset third lookup table and extract the damping torque value stored in the corresponding position.

The conventional control logic performing step S960 may include performing a logic for calculating steering feedback torque in response to rotation of the steering wheel and controlling it.

The adding step S970 may include adding the damping torque information and the steering feedback torque.

The final torque calculation step S980 may include calculating the final torque using the result of adding the size of the steering feedback torque and the size of the damping torque. Here, the final torque may mean catch-up prevention torque to be generated in the first motor to prevent catch-up.

Figure 10:
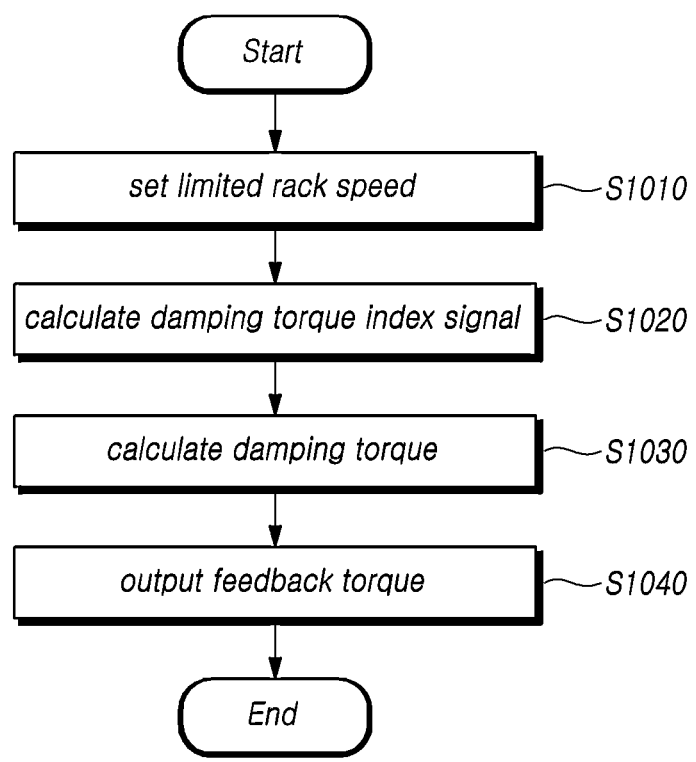
FIG. 10 is a flowchart illustrating a steering control method according to another embodiment.

FIG. 10 is a flowchart illustrating a steering control method according to another embodiment.

Referring to FIG. 10, a steering control method according to another embodiment may include a limited rack speed setting step S1010, a damping torque index signal calculation step S1020, a damping torque calculation step S1030, and a feedback torque output step S1040.

The limited rack speed setting step S1010 may include setting a limited rack speed that is the maximum rack speed limited due to the capacity limit of the second motor when rack force corresponding to the rack force information is applied to the rack, based on rack force information and second motor performance information.

The damping torque index signal calculation step S1020 may include calculating the index signal corresponding to the limited rack speed in the second motor curve table based on the limited rack speed and second motor curve table.

In this case, the second motor curve table may include curve information regarding the performance of the second motor. For example, the information regarding the T-N curve of the second motor may be configured in the form of a table.

Further, the damping torque index signal calculation step S1020 may include performing deadband processing based on the limited rack speed.

Specifically, the damping torque index signal calculation step S1020 may include setting a deadband including a deadband upper limit and a deadband lower limit based on the limited rack speed and determining whether to perform catch-up prevention control based on whether the command rack speed falls outside the deadband through deadband processing.

The damping torque calculation step S1030 may include calculating the damping torque information in the second motor curve table using the damping torque index signal. In this case, the damping torque index signal may be used to extract the corresponding value in the index portion of the second motor curve table, so that extracting the damping torque value stored in the storage position of the index corresponding to the damping torque index signal and calculating it as the damping torque information may be included.

The feedback torque output step S1040 may include outputting the final feedback torque to the first motor. Specifically, the feedback torque output step S1040 may calculate the final feedback torque in such a manner as to add damping torque information and steering feedback torque based on the steering feedback torque calculated by the conventional logic and the damping torque information and output the final feedback torque in the first motor based on the calculation result.

Thus, even when a command exceeding the capacity limit of the second motor due to, e.g., abrupt rotation of the steering wheel is generated, it is possible to perform catch-up prevention control capable of preventing catch-up by calculating damping torque using, e.g., the second motor curve table regarding the second motor performance and the limited rack speed, adding the damping torque to the steering feedback torque according to the conventional logic, and controlling to output the final feedback torque in the first motor.

According to the disclosure, the disclosure may provide a steering control device and method capable of preventing catch-up due to a limitation in motor capacity.

The disclosure may also provide a steering control device and method capable of predicting the possibility of catch-up based on motor information and command information according to the rotation of the steering wheel.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A steering control device for controlling a first motor generating steering feedback torque in response to rotation of a steering wheel and a second motor generating rack driving torque for moving a rack, the steering control device comprising:

a calculation unit calculating allowed rack speed information regarding a rack speed allowed when driving the rack using the second motor, based on rack force information and preset second motor performance information and calculating catch-up prevention torque information for preventing catch-up in the steering wheel, based on the allowed rack speed information and command rack speed information generated to drive the rack at a speed in response to rotation of the steering wheel; and a controller performing catch-up prevention control on the first motor based on the catch-up prevention torque information.

2. The steering control device of claim 1, wherein the calculation unit calculates corresponding motor torque information and corresponding motor speed information corresponding to the rack force information based on the second motor performance information and calculates the allowed rack speed information based on the corresponding motor torque information and the corresponding motor speed information.

3. The steering control device of claim 2, wherein the second motor performance information includes first lookup table information storing a motor torque value corresponding to each rack force value while using each rack force value as an index and second lookup table information storing a motor speed value corresponding to each motor torque value while using each motor torque value as an index, and wherein the calculation unit calculates the corresponding motor torque information based on the rack force information and the first lookup table information and calculates the corresponding motor speed information based on the corresponding motor torque information and the second lookup table information.

4. The steering control device of claim 2, wherein the calculation unit calculates the allowed rack speed information by multiplying the corresponding motor speed information by a preset gear constant.

5. The steering control device of claim 1, wherein the calculation unit calculates preset threshold rack speed information as the allowed rack speed information when the rack force information is preset threshold thrust information or less.

6. The steering control device of claim 1, wherein the second motor performance information includes third lookup table information storing a damping torque value corresponding to each rack speed value while using the rack speed value as an index, and wherein the calculation unit calculates damping torque information based on the command rack speed information, the allowed rack speed information, and the third lookup table information and calculates the catch-up prevention torque information based on the steering feedback torque and the damping torque information.

7. The steering control device of claim 1, wherein the calculation unit calculates rack speed difference information regarding a difference in size between the command rack speed information and the allowed rack speed information, and wherein the controller performs the catch-up prevention control when the rack speed difference information is a preset reference speed difference or more.

8. The steering control device of claim 1, wherein the calculation unit sets a deadband upper limit and a deadband lower limit based on the allowed rack speed information to calculate deadband range information, and wherein the controller performs the catch-up prevention control when the command rack speed information falls outside a range not more than the deadband upper limit and not less than the deadband lower limit, based on the deadband range information.

9. A steering control method for controlling a first motor generating steering feedback torque in response to rotation of a steering wheel and a second motor generating rack driving torque for moving a rack, the steering control method comprising:

an allowed rack speed information calculation step calculating allowed rack speed information regarding a rack speed allowed when driving the rack using the second motor, based on rack force information and preset second motor performance information;

a catch-up prevention torque information calculation step calculating catch-up prevention torque information for preventing catch-up in the steering wheel based on command rack speed information generated to drive the rack at a speed in response to rotation of the steering wheel and the allowed rack speed information; and a catch-up prevention control step performing catch-up prevention control on the first motor based on the catch-up prevention torque information.

10. The steering control method of claim 9, wherein the allowed rack speed information calculation step includes calculating corresponding motor torque information and corresponding motor speed information corresponding to the rack force information based on the second motor performance information and calculating the allowed rack speed information based on the corresponding motor torque information and the corresponding motor speed information.

11. The steering control method of claim 10, wherein the second motor performance information includes first lookup table information storing a motor torque value corresponding to each rack force value while using each rack force value as an index and second lookup table information storing a motor speed value corresponding to each motor torque value while using each motor torque value as an index, and wherein the allowed rack speed information calculation step includes calculating the corresponding motor torque information based on the rack force information and the first lookup table information and calculating the corresponding motor speed information based on the corresponding motor torque information and the second lookup table information.

12. The steering control method of claim 9, wherein the allowed rack speed information calculation step includes calculating preset threshold rack speed information as the allowed rack speed information when the rack force information is preset threshold thrust information or less.

13. The steering control method of claim 9, wherein the second motor performance information includes third lookup table information storing a damping torque value corresponding to each rack speed value while using the rack speed value as an index, and wherein the catch-up prevention torque information calculation step includes calculating damping torque information based on the command rack speed information, the allowed rack speed information, and the third lookup table information and calculating the catch-up prevention torque information based on the steering feedback torque and the damping torque information, and calculating the catch-up prevention torque information based on the steering feedback torque and the damping torque information.

14. The steering control method of claim 9, wherein the catch-up prevention torque information calculation step includes calculating rack speed difference information regarding a difference in size between the command rack speed information and the allowed rack speed information, and wherein the catch-up prevention control step includes performing the catch-up prevention control when the rack speed difference information is a preset reference speed difference or more.

15. The steering control method of claim 9, wherein the catch-up prevention torque information calculation step includes setting a deadband upper limit and a deadband lower limit based on the allowed rack speed information to calculate deadband range information, and wherein the catch-up prevention control step includes performing the catch-up prevention control when the command rack speed information falls outside a deadband range in the deadband range information.

\* \* \* \* \*